Figure 1A:
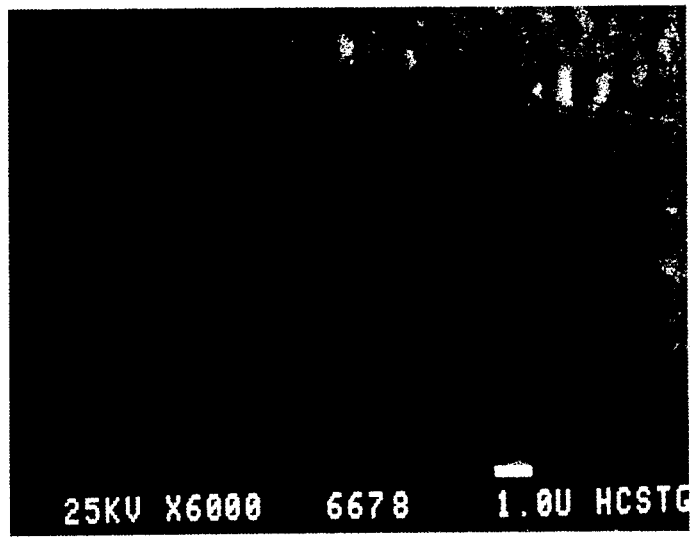

United States Patent [19]

Albrecht et al.

[11] Patent Number: 4,548,672
[45] Date of Patent: Oct. 22, 1985

[54] PROCESS FOR TREATING THE SURFACE OF VALVE METALS WITH CHALCOGENS

[75] Inventors: Wolf-Wigand Albrecht; Axel Hoppe, both of Bad Harzburg; Uwe Papp, Goslar; Rüdiger Wolf, Vienenburg, all of Fed. Rep. of Germany

[73] Assignee: Hermann C. Starck Berlin, Berlin, Fed. Rep. of Germany

[21] Appl. No.: 655,635

[22] Filed: Sep. 28, 1984

[30] Foreign Application Priority Data

Oct. 6, 1983 [DE] Fed. Rep. of Germany ....... 3336453

[51] Int. Cl.⁴ ................................................ B22F 1/04
[52] U.S. Cl. ................................ 156/646; 75/0.5 BB; 75/0.5 AB; 148/6.3
[58] Field of Search .............................. 156/664, 646; 75/0.5 BB, 0.5 AB; 148/6.3

[56] References Cited

U.S. PATENT DOCUMENTS

| | | |
|---|---|---|
| 4,009,007 | 2/1977 | Fry ........................................... 29/75 |
| 4,154,609 | 5/1979 | Hähn ....................................... 75/252 |
| 4,231,790 | 11/1980 | Hähn et al. . |
| 4,356,028 | 10/1982 | Bates . |

OTHER PUBLICATIONS

*Official Gazette*, Apr. 5, 1983, vol. 1029, p. 184, summary of U.S. Pat. No. 4,379,128.

*Primary Examiner*—Sam Silverberg
*Attorney, Agent, or Firm*—Cushman, Darby & Cushman

[57] ABSTRACT

The invention relates to a process for treating the surface of valve metals, in particular niobium and tantalum, in the form of agglomerated or non-agglomerated powders, thin foils or molded articles prepared from powder, for use as electrolytic capacitor electrodes, these metals being heated in at least one stage to temperatures of 300° to 2,000° C. under a high vacuum or an inert gas atmosphere and in the presence of chalcogens or chalcogen compounds, excluding oxygen.

9 Claims, 2 Drawing Figures

PROCESS FOR TREATING THE SURFACE OF VALVE METALS WITH CHALCOGENS

The present invention relates to the structure-modifying treatment of the surfaces of valve metals of the 5th sub-group of the periodic system of the elements, in particular niobium and tantalum, by the action of small amounts of chalcogens or chalcogen compounds, excluding oxygen, in a high vacuum or under an atmosphere of an inert gas, as claimed in the patent claims. The valve metal is preferably in the form of powder or foil. The active surface area of the valve metal is increased in an advantageous manner by the measures claimed, so that, when the valve metal is used as the anode material for electrolytic capacitors, an improvement is achieved in the electrical properties of the capacitor.

When tantalum metal is used as the anode material for electrolytic capacitors, either in the form of thin foils for wound capacitors or in the form of metal powder for porous sintered articles, it is important to ensure that the activity of the surface, which acts as the capacity-determining substrate for the anodically applied dielectric layer, is as great as possible.

Mechanical roughening processes or chemical etching processes are known as the most important measures for increasing the surface area of valve metal foils. However, these known processes are always associated with abrasion or dissolution losses and lead to undesirable impurities on the surface of the foils caused both by the abrasives used for grinding or masking and by residues of a chemical nature; in the event of hydrofluoric acid treatment, which is generally customary, hydride formation and brittle fracture also occur.

Roughening the surface of pulverulent niobium or tantalum metal by means of chemical etching processes is problematical and is scarcely used, because it is difficult to control a planned and specific treatment at the customary wide particle size spectra of the metal powders. The problem of dissolution losses and of contamination exists in this case too.

Although additives having a specific action on the particle size in the preparation of tantalum powder for capacitor purposes have a direct effect on the surface area (specific surface area: m$^2$/g) of the metal powder, the use of additives is limited, according to the state of the art, to the elements boron, phosphorus, nitrogen and silicon. Thus the use of boron as a "doping agent" before, during or after the preparation of the tantalum powder is described, for example, in German Offenlegungsschrift No. 3,140,248. However, these measures have no noticeable effect on the surface structure of the metal particle surface, but probably act as an intermetallic alloy phase which has a particularly advantageous influence on the electrical properties of the dielectric oxide layer which has been applied anodically to the metal surface. An analogous situation also exists when phosphorus is employed as the doping element, as is described, for example, in German Offenlegungsschriften Nos. 3,005,207, 3,230,219 or 2,616,367.

The use of inorganic lubricants based on compounds of the metals of the groups IV b, V b and VI b of the periodic system of the elements is described in German Pat. No. 2,610,224. According to this patent specification, it has been found that the metal compounds mentioned therein have a beneficial effect, as lubricants, in prolonging the service lives of compacting dies in the powder-metallurgical processing of tantalum powder. When the said lubricants are used, the aim is to increase the porosity of the anodes by exerting a reduced pressure on the green compacts. No information is given in the said publication on the nature of this surface of tantalum powder particles or tantalum metal foils.

Limits are set to enlarging the specific surface area (m$^2$/g) of tantalum metal capacitor powders by reducing the particle size. The processes known hitherto for obtaining very fine tantalum powders having irregular particle shapes, for example as specified in German Pat. No. 2,517,180, provide particle sizes which are scarcely suitable for applications in which capacitors are employed at fairly high working potentials, because the increase in the layer thickness of the dielectric oxide layer in some cases exceeds the dimension of the particle sizes and hence some of the tantalum powder particles become ineffective as charge carriers for lack of metallic conductivity.

It is, therefore, an object of the invention, independently of the particle size-oriented development (or improvement) of valve metal powders in the sense of enlargement of the surface area, to find a method by means of which the said metal surfaces are roughened by a type of etching process and the surface areas are thereby enlarged in the same manner without the occurrence of material losses caused by a dissolving or attrition process.

This object is now achieved in accordance with the invention by heating the valve metal, in particular niobium or tantalum, in the form of agglomerated or non-agglomerated powders, thin foils or molded articles prepared from powder, at temperatures of 300° to 2,000° C. for a certain length of time, under the influence of elementary chalcogens or compounds thereof, excluding oxygen, and in a high vacuum or under an atmosphere of inert gas (protective gas).

Chalcogens which should be mentioned particularly are sulfur, selenium or tellurium; chalcogen compounds are, in particular, the readily available compounds of these elements.

These chalcogens or chalcogen compounds are preferably used in amounts of 20 to 5,000 ppm, preferably 30 to 2,000 ppm, on the basis of the elements and relative to the metal employed.

The process, according to the invention, for allowing the chalcogens or chalcogen compounds to act on the valve metals can be carried out in various ways.

For example, the thermochemical after-treatment according to the invention can be carried out by introducing the chalcogen, for example sulfur, as a doping additive into the valve metal powder in the course of the process of preparation, i.e. before or during reduction, in order to achieve in this way as homogeneous a distribution as possible of the chalcogen, for example sulfur, in the metal.

If it is necessary, however, to start from pure or very pure valve metal (as is the case, in particular, with foils of this metal), it is also possible within the scope of the invention to carry out the treatment of the metal with gaseous chalcogen compounds (in the case of the chalcogen sulfur this is preferably hydrogen sulfide). This is preferably effected by initially setting up a certain partial pressure of the gaseous chalcogen compound in the vacuum or inert gas receiver during the heat treatment of the metal, and maintaining this partial pressure for the duration of the treatment.

The simplest embodiment of the treatment according to the invention, of tantalum powder, for example, consists in mixing tantalum metal powder with chalcogen compounds, in particular sulfur compounds, or with finely divided elementary sulfur, which can, for example, be obtained very easily in a colloidal form.

The treatment, according to the invention, of the valve metal powder can, however, also be carried out effectively as an accompanying measure in the course of one of the known thermal agglomeration processes. This can be effected, for example, by passing a metered amount of gaseous sulfur compounds over the powder composition. It is also possible, however, to apply sulfur compounds or elementary sulfur to the valve metal powder by impregnation or mixing prior to agglomeration.

If gaseous chalcogen compounds are employed in the process according to the invention, hydrogen sulfide is preferred.

In addition, the treatment, according to the invention, of the valve metals can also be carried out as an accompaniment to the sintering process for valve metal anodes. This can be effected, for instance, by impregnating the green or pre-sintered anodes of valve metal powder, in particular tantalum powder, with solutions containing a chalcogen, in particular sulfur, and drying the anodes, or by carrying out the process of sintering the anodes with a metered addition of gaseous sulfur compounds, in particular hydrogen sulfide.

Finally, the process according to the invention can also be combined with a deoxidizing heat treatment as specified in German Offenlegungsschrift No. 3,130,392, for example with an agglomeration process in the presence of reducing metals. In the event of an embodiment of this type, it is even possible to disregard a possible content of oxygen and/or alkali metal in the chalcogen compounds employed, i.e. it is possible, for example, also to employ salts of oxygen acids of the chalcogens, while at the same time increasing the amount of deoxidizing agent (reducing metals) pro rata, the oxygen content then being eliminated in a single operation.

The temperature selected for the heat treatment according to the invention depends on the nature of the chalcogen compound employed, the pyrolitic cleavage of which is decisive for the process under certain circumstances. In accordance with the invention, the temperature is between 300° and 2,000° C., 500° to 1,800° C. being preferred. If, for example, hydrogen sulfide is employed, a temperature of approx. 600° to 1,200° C. is preferable.

It is sufficient in this process if the treatment at these temperatures is carried out in at least one stage, ie. it is adequate if this heating is carried out in the course of at least one treatment stage.

In the process, according to the invention, of treating valve metals with chalcogens it is also possible to employ those valve metal powders, in particular niobium or tantalum metal powders, which already contain other doping agents of the usual type and of the usual selection, or to which other doping agents of this type have been added, together with the chalcogen compounds, before a heat treatment of any desired kind. Phosphorus, boron, nitrogen and silicon may be mentioned as examples of already known doping agents of this type.

The examples below illustrate the invention without limiting its application.

EXAMPLE 1

1% by weight of a 10% strength solution of sodium thiosulfate was added to a hot, saturated solution of potassium tantalum fluoride in hydrofluoric acid, such as is customarily used in refining the crude salt by recrystallization, the amount of sodium thiosulfate being relative to the amount of crude salt ($K_2TaF_7$) employed. An odor of $SO_2$ manifested itself when the solutions were mixed, and the solution gradually became turbid because of finely divided elementary sulfur. The solution was induced to crystallize in a known manner, and the mash of crystals is decanted mechanically.

The dried potassium tantalum fluoride containing sulfur was employed for the preparation of fine tantalum powder in accordance with the process of German Pat. No. 2,517,180, Example 1; it afforded, as the end product, a tantalum metal powder containing approx. 1,200 ppm of sulfur. This powder was subjected to the electrical test in comparison with sulfur-free powder, ie. it was shaped into pressings, sintered in a high vacuum under the conditions indicated in Table I, activated anodically and subjected to electrical measurement. The results of these measurements are characterized in Table II as FIG. 1 and FIG. 1A, the sulfur-free comparison sample being designated A.

EXAMPLE 2

The process according to the invention was applied by carrying out the sulfurization reaction during the process of sintering tantalum anodes. For this purpose, a batch of tantalum anodes which had been prepared from tantalum metal powder by compaction to give cylindrical molded articles were reacted, subsequent to the degassing phase which takes place at 900° to 1,100° C., with a gaseous sulfur compound, this being effected by metering in 50 mb of $H_2S$ into a vacuum receiver for a period of 3 minutes, during which the temperature remained constant at 1,100° C. The residual gases were then pumped out until a constant high vacuum was reached, and the sintering of the anodes was concluded in a known manner (see Table I). The sintered articles which had been treated with sulfur were anodized and subjected to electrical measurement in comparison with untreated anodes. The test conditions and the results determined are to be found in Table I and II (the sulfur-free comparison sample is designated 2A).

EXAMPLE 3

Selenium in the form of $Na_2SeO_4$ was added, in accordance with the invention, to an agglomeration, carried out in the usual manner, of tantalum metal powder with magnesium metal, such as is described in German Offenlegungsschrift No. 3,130,392, example 2. The amount of Se, relative to the Ta content, was 2,000 ppm. In calculating the amount of of the deoxodizing agent, account was taken of the oxygen additionally introduced through $Na_2SeO_4$.

The deoxidized, selenium-containing powder was sintered and subjected to an electrical test in comparison with a similarly deoxidized tantalum powder which was free from selenium. The experimental conditions of this test are indicated in Table I.

The results of these measurements can be seen in Table II, the selenium-free comparison sample being designated 3A.

EXAMPLE 4

Figure 1B:

A niobium foil for capacitor purposes was spread out over a tantalum boat containing a flat layer of niobium sulfide (as a medium for evolving sulfur vapors). After a 30-minute heat treatment at 1,200° C. under an argon atmosphere, the foil has only a matt surface gloss. The scanning electron micrograph (cf. FIGS. 1a and 1b) shows clearly, in comparison with an untreated foil (FIG. 1a), that a considerable roughening of the surface of the foil has taken place (FIG. 1b).

TABLE I

Conditions of sintering and measurement

|  | Example 1 + 1 A | Example 2 + 2 A | Example 3 + 3 A |
|---|---|---|---|
| Sintering temperature (°C.) | 1,500 | 1,600 | 1,550 |
| Sintering time (minutes) | 20 | 20 | 20 |
| Weight of anode (g) | 0.2 | 0.2 | 0.2 |
| Diameter of anode (mm) | 4.6 | 4.0 | 4.6 |
| Pressed density (g/cm³) | 4.5 | 4.5 | 4.0 |
| Anodization voltage (V) | 70 | 70 | 70 |
| Anodization current density (mA/g) | 35 | 35 | 35 |
| Time for complete anodization (hrs.) | 2 | 2 | 2 |
| Electrolyte bath (% of H₃PO₄) | 0.1 | 0.1 | 0.01 |
| Bath temperature (°C.) | 60 | 90 | 90 |

TABLE II

Results determined in Examples 1 to 3

|  | Specific charge mC/g | Leakage current µA/mC | Breakdown voltage Volts |
|---|---|---|---|
| Example 1 | 30 | 0.3 | 145 |
| 1 A | 24 | 1.4 | 120 |
| Example 2 | 19.5 | 0.2 | 180 |
| 2 A | 16 | 0.3 | 140 |
| Example 3 | 20 | 0.3 | 160 |
| 3 A | 18 | 0.3 | 120 |

We claim:

1. A process for treating the surface of valve metals in the form of agglomerated or non-agglomerated powders, thin foils or molded articles prepared from powder for use as electrodes for electrolytic capacitors, which process comprises heating these metals in at least one stage to temperatures of from 300° to 2,000° C. under a high vacuum or in an inert gas atmosphere in the presence of chalcogens or chalcogen compounds, excluding oxygen.

2. The process as claimed in claim 1, wherein the chalcogens used are sulfur, selenium or tellurium or compounds of these elements.

3. The process as claimed in claim 1, wherein the chalcogens or compounds thereof are used in amounts of 20 to 5,000 ppm, on the basis of the elements and relative to the metal.

4. The process as claimed in claim 1, wherein the valve metal used is tantalum metal powder which, as a result of its process of preparation, already contains chalcogens in amounts of 20 to 5,000 ppm as a doping agent.

5. The process as claimed in claim 1, wherein, after the metal powder has been obtained, chalcogens or chalcogen compounds in amounts of 20 to 5,000 ppm, on the basis of the elements, are added to the powder by mixing or impregnation.

6. The process as claimed in claim 1, wherein the chalcogens or chalcogen compounds are added to the metal powder before or during an agglomeration stage.

7. The process as claimed in claim 1, wherein chalcogens or chalcogen compounds are added to molded articles prepared from a valve metal powder before or during a heat treatment.

8. The process as claimed in claim 1, wherein the valve metal contains doping agents.

9. The process as claimed in claim 8, wherein said doping agents are added, at the same time as the chalcogens or chalcogen compounds.

* * * * *